United States Patent Office
2,834,754
Patented May 13, 1958

2,834,754

PROCESS FOR REMOVING VOLATILE ORGANO-POLYSILOXANES FROM HIGH MOLECULAR WEIGHT ORGANOPOLYSILOXANES BY STRIPPING GAS AND KNEADING

Robert L. Hatch, Pittsfield, Mass., and John F. Blumenfeld, Schenectady, N. Y., assignors to General Electric Company, a corporation of New York No Drawing. Application December 3, 1953
Serial No. 396,068

8 Claims. (Cl. 260—46.5)

This invention is concerned with a process for removing low molecular weight, volatile organopolysiloxanes from organopolysiloxanes convertible to the cured, solid, elastic state. More particularly, the invention is concerned with a process which comprises subjecting a convertible organopolysiloxane to an intensive kneading action while simultaneously introducing and passing a stripping gas selected from the class consisting of air, steam, neon, nitrogen and argon through the aforesaid convertible organopolysiloxane thereby removing varying amounts (e. g., at least 50 percent) of the volatile organopolysiloxanes boiling below 250° C. when measured at 760 mm. present in the aforesaid convertible organopolysiloxane.

Organopolysiloxanes, which are convertible to the cured, solid, elastic state, for instance, by heat in the presence of curing agents or by irradiation with high energy electrons, are generally prepared by condensing a low molecular weight organopolysiloxane or mixture of organopolysiloxanes with a polymerizing agent, such as alkaline condensing agents, for instance, sodium hydroxide, potassium hydroxide, etc.; acidic condensing agents, for instance, ferric chloride, etc.; benzoyl peroxide, etc. The convertible organopolysiloxanes obtained from the low molecular weight organopolysiloxane have been found to contain low molecular weight (below 500 molecular weight), volatile materials similar in structure (i. e., containing the same recurring unit) to the bulk of the convertible organopolysiloxane.

Thus, octamethylcyclotetrasiloxane can be polymerized with small amounts of potassium hydroxide to yield a viscous, benzene-soluble convertible methylpolysiloxane which is of extremely high molecular weight and has only slight flow at room temperature. If a filler is added to such convertible methylpolysiloxane and a curing agent such as benzoyl peroxide incorporated, and the combination of ingredients molded at elevated temperatures in the usual manner, the cured solid elastic product, although having good resistance to elevated temperatures, nevertheless exhibits the disadvantage that when subjected to elevated temperatures of the order of about 200 to 250° C. for prolonged periods of time, there occur undesirable weight losses, which result in not only economic losses due to the volatile materials lost, but also the cured product tends to show disadvantageous shrinkage characteristics. In addition, the presence of these low boiling volatile organopolysiloxanes prevents attainment of optimum compression set characteristics of the cured, solid elastic product when the latter is subjected under compression to elevated temperatures of the order of about 250° C. and thereafter the compression released. It has been determined that these disadvantageous shrinkage characteristics and unsatisfactory compression set properties can be minimized by removing certain volatile organopolysiloxanes which are contained in the cured, solid, elastic organopolysiloxane. In connection with the aforesaid cured, solid, elastic methylpolysiloxane, it has been found that these volatile materials boiling below 250° C. comprise generally octamethylcyclotetrasiloxane, decamethylcyclopentasiloxane, and dodecamethylcyclohexasiloxane in amounts ranging from about 5 to 15% or more of the weight of the methylpolysiloxane.

The convertible organopolysiloxanes with which the present invention is concerned may be highly viscous masses or gummy, elastic solids, depending on the state of condensation, the condensing agent employed, the starting organopolysiloxane used to make the convertible organopolysiloxane, etc., they will hereinafter be referred to as "convertible organopolysiloxane" or, more specifically as "convertible methylpolysiloxane." Although convertible organopolysiloxanes with which the present invention is concerned are well known, for purposes of showing persons skilled in the art the various convertible organopolysiloxanes which may be employed in the practice of the present invention, attention is directed to the convertible organopolysiloxanes disclosed and claimed in Agens Patent 2,448,756, issued September 7, 1948, or Sprung et al. Patent 2,448,556, issued September 7, 1948, Sprung Patent 2,484,595, issued October 11, 1949, Krieble et al. Patent 2,457,688, issued December 28, 1948, Hyde Patent 2,490,357, issued December 6, 1949, Marsden Patent 2,521,528, issued September 5, 1950, and Warrick Patent 2,541,137, issued February 13, 1951.

It will, of course, be understood by those skilled in the art that other convertible organopolysiloxanes containing the same or different silicon-bonded organic substituents (e. g., methyl, ethyl, propyl, phenyl, tolyl, xylyl, benzyl, phenylethyl, naphthyl, chlorophenyl, both methyl and phenyl, etc., radicals) connected to silicon atoms by carbon-silicon linkages, may also be employed.

The particular convertible organosiloxane used may be any one of those described in the foregoing patents which are generally obtained by condensation of a liquid organopolysiloxane containing an average of from about 1.95, preferably from about 1.98, to about 2.05 organic groups per silicon atom. The usual condensing or polymerizing agents which may be employed and which are well known in the art may include, for instance, ferric chloride hexahydrate, phenyl phosphoryl chloride, alkaline condensing agents, such as potassium hydroxide, sodium hydroxide, etc. These convertible organopolysiloxanes generally comprise polymeric diorganosiloxanes which may contain, for example, 2 mol percent copolymerized monoorganosiloxane, for example, copolymerized monomethylsiloxane. As the starting liquid organopolysiloxane from which the convertible organopolysiloxane is prepared, one advantageously uses an organopolysiloxane which contains about 1.999 to 2.01, inclusive, organic groups, for example, methyl groups, per silicon atom and where more than about 80 percent of the silicon atoms in the polysiloxane contain two silicon-bonded dialkyl groups.

The starting organopolysiloxanes used to make the convertible organopolysiloxanes by condensation thereof preferably comprise organic substituents consisting essentially of monovalent organic radicals attached to silicon through carbon-silicon linkages, there being on the average between 1.95 and 2.25 organic radicals per silicon atom, and in which the siloxane units consist of units of the structural formula $R_2SiO$ where R is preferably a radical of the group consisting of methyl and phenyl radicals. At least 90 percent of the total number of R groups are preferably methyl radicals. The polysiloxane may be one in which all of the siloxane units are $(CH_3)_2SiO$ or the siloxane may be a copolymer of dimethylsiloxane and a minor amount (e. g., from 1 to 20 mol percent) of any of the following units alone or in combination therewith:

$$C_6H_5(CH_3)SiO$$

and $(C_6H_5)_2SiO$

In the copending application of Ben A. Bluestein, Serial No. 396,069, now Patent No. 2,793,198, and in the copending application of Frederick M. Lewis, Serial No. 396,066, now Patent No. 2,810,705, both filed concurrently herewith and assigned to the same assignee as the present invention, are described and claimed convertible organopolysiloxanes and cured products therefrom having low shrink characteristics and improved compression set properties as a result of the removal of these low boiling volatile materials. The aforesaid Bluestein and Lewis applications describe various means for removing these volatile organopolysiloxanes. The present invention is concerned with an improved process for removing these volatile organopolysiloxanes by intensively kneading the convertible organopolysiloxane while simultaneously passing an inert gas through the aforesaid convertible organopolysiloxane to remove for optimum results at least 95 percent, and preferably at least 98 percent, of the volatile organopolysiloxanes boiling below 250° C. when measured at 760 mm. contained in the aforesaid convertible organopolysiloxane.

By means of our invention, it is possible to remove these volatile organopolysiloxanes (hereinafter so designated to include volatile organopolysiloxanes boiling below 250° C. when measured at 760 mm.) in relatively short periods of time from kneadable organopolysiloxane systems without any undesirable effects on the final product. That such rapid removal of the volatile components could be effected was entirely unexpected and in no way could have been predicted since it was found that under similar conditions of kneading, and using elevated temperatures of the order of about 125 to 150° C. while applying vacuum, one did not obtain anywhere near as rapid a reduction in volatile content. In addition a point was reached below which it was impossible to reduce the volatile content, this point being substantially higher than the point obtainable by the use of our invention even within shorter periods of time. Even mechanical mixing with water in an amount equal to 10 percent of the weight of the convertible organopolysiloxane followed by a heat and vacuum devolatilization again did not result in as rapid a removal of the volatile components as could be obtained by the concurrent use of the kneading action and the inert gas.

The manner of practicing our invention is relatively simple and is not attended by such difficulties as are inherent in the use of other processes for removing volatile products from the higher molecular weight material. Thus, one suggestion for removing these volatiles comprised dissolving the entire convertible organopolysiloxane in a solvent therefor, for instance, toluene, followed by differential precipitation of the high molecular weight polymer with methanol. On large scale operations, the precipitation and subsequent polymer separation and drying offer major problems in the need for handling and purifying large volumes of solvents, which renders such a process expensive and unsatisfactory, besides introducing the hazard of inflammable solvents. An alternative process involved baking the convertible organopolysiloxane in an oven for a long period of time until substantially all the low molecular weight volatile materials were removed. However, this baking operation was exceedingly slow, produced a potentially explosive atmosphere in an oven, and resulted in loss of the volatiles despite the most careful control in recovering the latter. Since the value attached to the volatiles is substantial, this in itself restricted the application of this process.

In contrast to the above-described processes with their difficulties, our process can be easily and economically carried out by subjecting the convertible organopolysiloxane containing these volatile compositions to an intensive kneading action in a suitable apparatus for the purpose. We have found that such an apparatus satisfactorily comprises a Baker-Perkins mixer (a Banbury mixer may also be employed) which has sigma-type blades rotating in opposite directions so that the kneadable convertible organopolysiloxane, which is advantageously a highly viscous mass of at least 500,000 centipoises to 20 or 30 million centipoises viscosity, is intensively kneaded and all portions of the convertible organopolysiloxane are intimately mixed so as to offer a rapidly changing exposed surface area. The rate at which the arms of the mixer rotate may be varied widely as long as there is a sufficiently rapid movement and kneading of the convertible organopolysiloxane in the mixer. Such a rate will depend upon such factors as the type of apparatus employed, the type of convertible organopolysiloxane used, the mass of material in the mixer, the viscosity of the convertible organopolysiloxane, the rate at which it is desired to remove the volatile organopolysiloxanes by means of the inert gas, etc. A cycle of about 40 to 80 revolutions per minute of the kneading arms is usually satisfactory although this can be varied higher or lower depending upon the above-described factors.

During this kneading operation, it is desirable to maintain the temperature of the material being kneaded at from about 50° to 175° C. or higher, in order to facilitate the movement of the inert gas through the convertible organopolysiloxane by reducing the viscosity of the latter, increase the vapor pressure of the volatile compositions, and to supply the latent heat of vaporization of the volatiles. When using a Baker-Perkins mixer, a jacket through which steam can be introduced to effect heating of the mixer and the convertible organopolysiloxane, is advantageously employed.

The bulk temperature within the convertible organopolysiloxane is preferably not allowed to exceed 150° C. The allowable temperature of the convertible organopolysiloxane in contact with the walls of the mixer immediately adjacent the heating jacket will vary depending upon such factors as the type of organipolysiloxane being used, whether steam or other inert gases are being used, whether any polymerizing agent is present in the convertible organopolysiloxane, etc. Where steam is introduced into the chamber in which the organiopolysiloxane is being kneaded, it is essential, in order to prevent undesirable degradation of the polymer, to render the polymerizing agent inert, as for instance, by a suitable washing operation, or by neutralization or by other means. If the catalyst is removed under such circumstances, little, if any, harmful effects on the polymerization will occur even if the temperature of the walls of the mixer with which the convertible organopolysiloxane may come in contact, should rise to 175° C. Where other inert gases such as dry air are employed in the same manner as the above-recited steam, it is not necessary to render inert any polymerizing agent present in the convertible organopolysiloxane, and no undesirable deleterious effects will be encountered even if the temperature of the walls of the mixer should rise as high as 175° C. It is highly desirable that the temperature of the introduced inert gas (including the steam) should not exceed about 200° C. Obviously it is not necessary that the required heat be provided by a heated jacket; any suitable means for providing the desired heat during the kneading operation may be used.

The inert gas (i. e., the volatile-inducing gas) which is employed in the practice of the present invention may comprise any one of those well known in the art as, for instance, air, steam, neon, nitrogen, argon, etc. We prefer to employ either air or steam for economic reasons. In passing the inert gas through the kneaded convertible organopolysiloxane, the inert gas is introduced into the chamber of the mixer and mechanically entrained in small bubbles in the mass by the kneading action of the mixer. The volatile materials in the mass are then believed to vaporize into these bubbles of inert gas up to the point where the partital pressure of the volatiles in the bubbles equals the vapor pressure of the volatiles in the convertible organopolysiloxane. These bubbles containing vaporized volatiles are then brought to the surface of the convertible organipolysiloxane by the continued kneading action of the mixer, and are swept away out of the kneading chamber by the inert gas stream. Meanwhile more bubbles of fresh inert gas containing no volatiles are kneaded into the convertible organopolysiloxane, and more volatiles are removed by the same mechanism. Instead of passing the inert gas (which terminology for brevity is intended to include steam) into the chamber above the mass being kneaded, the inert gas may be led, by suitable means, into the bottom of the kneading chamber so that the exit end of the entering gas terminates under the mass being kneaded. The inert gas and volatile materials are then advantageously led to a suitable collection unit which may comprise a condenser for the low boiling volatile compositions. By passing the inert gas through the kneading chamber so the gas is first entrained in the convertible organopolysiloxane and then released and swept out to appropriate collection units, it is possible to reduce the volatile content of the convertible organopolysiloxane within periods of time ranging from about 30 minutes to about 5 hours or even less, from about 15 percent down to 5 percent and usually well under 2 percent. Obviously removal of higher volatile concentrations from convertible organopolysiloxanes are not precluded.

Various pressures including atmospheric, super-atmospheric, and sub-atmospheric pressures may be employed in the kneading chamber while introducing the inert gas. Generally, we have found that introduction of the inert gas at atmospheric pressure during the kneading operation is satisfactory to remove the volatile organopolysiloxanes.

The rate at which the inert gas is introduced into the chamber in which the convertible organopolysiloxane is being kneaded may be varied within wide limits. Generally we have found that for each pound of convertible organopolysiloxane being kneaded, one may advantageously introduce from about 0.1 to 1.0 standard cubic feet per minute (where the standard conditions are 0° C. one atmosphere) or more of the inert gas, i. e., the stripping gas which is intended to strip the volatile organopolysiloxanes from the convertible organopolysiloxane. Obviously, it will be apparent to those skilled in the art that the temperatures of operation, the stripping gas used (mixtures of stripping gases may also be employed), stripping gas rate, time during which the stripping operation is carried out, pressure, etc., may be varied widely depending upon many factors including the stripping gas used, the convertible organopolysiloxane employed, the degree of removal of volatile organopolysiloxanes, etc.

In order that those skilled in the art may better understand how the present invention may be practiced, the following examples are given by way of illustration and not by way of limitation. In the following examples, the test for volatile content and losses of volatiles was made by heating a 0.1 gram sample of the convertible organopolysiloxane at the time specified, during the test under 20 mm. Hg, absolute pressure, for 45 minutes at 135° C., and then computing the percentage weight loss.

EXAMPLE 1

A highly viscous convertible organopolysiloxane, specifically a polymeric dimethylsiloxane was prepared by polymerizing at a temperature of about 150° C. for about 4 hours octamethylcyclotetrasiloxane with about 0.01 percent, by weight, of potassium hydroxide. The benzene-soluble polymer thus obtained had a viscosity of about 6,900,000 centipoises, and had slight flow at room temperature. This convertible polymeric dimethylsiloxane, which for brevity will be hereinafter referred to as "polydimethylsiloxane" was then placed in a Baker-Perkins mixer having sigma blades rotating inwardly at different speeds. The mixer had jacketed sides into which steam could be introduced. The convertible methylpolysiloxane contained about 11.5 percent, by weight, of low molecular weight methylpolysiloxanes boiling below 250° C. and comprised essentially octamethylcyclotetrasiloxane, decamethylcyclopentasiloxane, and dodecamethylcyclohexasiloxane. While rotating the blades of the mixer and exercising intensive kneading of the convertible methylpolysiloxane, air or steam was introduced into the chamber so that the inert gas was exposed to the surface of the convertible organopolysiloxane being kneaded and was carried into the convertible methylpolysiloxane by the kneading action to effect intimate dispersion of the stripping gas. During this introduction of the air or steam, the gas pressure in each case was maintained at slightly above atmospheric pressure, and the chamber of the mixer was heated by passing steam through the outer jacket thereof so that the bulk temperature of the convertible methylpolysiloxane was of the order of about 140 to 150° C. making the outlet gas temperature about 115–120° C. in each case. The inlet gas temperature of the air was 20° C. while the inlet temperature of the steam was about 120° C. Table I below shows the conditions of the passage of the stripping gases as well as the volatile methylpolysiloxanes present at the beginning and at the end of the processing. In each case the starting weight of convertible methylpolysiloxane was about 8 pounds. Run Nos. 1 to 5, inclusive, involved the use of steam and run Nos. 6 and 7 used air. It will be clearly apparent from an examination of the following table that air or steam are equally effective on a mol for mol basis in the removal of volatile organopolysiloxanes from convertible organopolysiloxanes containing the latter. One fact in determining whether one should employ air or steam involves the consideration that in order to recover the volatiles with air stripping, refrigeration or an absorption process is required, whereas in contrast to this, recovery of the volatiles from a steam stripping operation involves only a simple condensation of the steam and the volatiles and subsequent separation of the two liquid phases by decantation. The table additionally shows that in the relationship between stripping gas rate (std. ft.³/min. per pound of crude gum) and devolatilization time (minutes) at rates lower than 0.16–0.20 std. ft.³/min. per pound, the time required for the removal of

*Table I*

| Test No. | Devolatilization Time, min. | Std. ft.³ Gas Used | Gas Rate, Std. ft.³ min. per lb. gum | Percent Volatile At Start of Devol. | Methylpolysiloxanes At End of Devol. | Time to Remove X percent of Volatile Methylpolysiloxanes, min. | | | |
|---|---|---|---|---|---|---|---|---|---|
| | | | | | | X=50 | X=75 | X=82.5 | X=90 |
| 1 | 186 | 96.0 | 0.065 | 10.8 | 1.9 | 61 | 142 | 186 | ------ |
| 2 | 210 | 275.5 | 0.158 | 10.6 | 0.6 | 48 | 87 | 105 | 142 |
| 3 | 162 | 304.5 | 0.226 | 11.1 | 0.9 | 48 | 82 | 103 | 143 |
| 4 | 134 | 376.0 | 0.338 | 6.3 | 0.4 | 54 | 84 | 95 | 116 |
| 5 | 174 | 512.5 | 0.394 | 11.9 | 1.0 | 33 | 65 | 82 | 122 |
| 6 | 169 | 214.0 | 0.161 | 11.1 | 0.7 | 37 | 69 | 93 | 138 |
| 7 | 129 | 163.0 | 0.162 | 11.1 | 1.7 | 42 | 78 | ------ | ------ |

75 percent or more of the volatile materials becomes excessive. At higher rates, the saving in time must be balanced against the additional cost of stripping gas and condenser surface. Furthermore, it should be noted that the driving force for removal of the volatiles is the difference between the vapor pressure of the volatiles in the convertible methylpolysiloxane and the partial pressure of volatiles in the stripping gas. When this difference is large, devolatilization proceeds rapidly. Thus, during early stages of devolatilization when a large amount of low boiling volatiles is present, the vapor pressure of volatiles in the gum is relatively high, resulting in a large driving force and rapid devolatilization. However, increasing the stripping gas rate will result in a lowered partial pressure of volatiles in the stripping gas, an increased driving force and therefore more rapid devolatilization. However, this increased devolatilization rate acts in turn partially to minimize the increase in driving force, so that the devolatilization rate increases more slowly with increased gas rate than might be expected. In some respects, above certain gas rates, the speed of devolatilization is limited by the transfer of heat into the convertible methylpolysiloxane. Thus, for low percentage removal where the devolatilization rate is high, this limit is shown to have been reached at a comparatively low stripping gas rate (0.15 std. ft.$^3$/min. per pound). At 90 percent removal, because of the comparatively low heat requirements, this point is outside the scope of the table. Analysis of the recovered volatile materials showed that about 44% was octamethylcyclotetrasiloxane, 29% was decamethylcyclopentasiloxane, and 27% comprised essentially dodecamethylcyclohexasiloxane.

EXAMPLE 2

This example illustrates the advantages of using either steam stripping or air stripping when compared with vacuum stripping methods of removing the low boiling volatiles. In run Nos. 8 and 9, the introduction of the steam or air was carried out in the same manner as described in Example 1. The run in connection with test No. 10 involved merely applying the described vacuum to the kettle while the gum was being intensively kneaded in the Baker-Perkins mixer (which was employed in all the tests) and thereafter heating the kettle through the jacket so as to raise the temperature of the gum to the stipulated temperature. Test No. 11 involved adding water to the convertible methylpolysiloxane and thereafter, while kneading the mixture, applying a vacuum and heating the reaction chamber to the stipulated temperature. In test No. 12, the convertible methylpolysiloxane was washed in the Baker-Perkins mixer by adding water thereto in a sufficient amount to give about a 1 to 1 weight ratio, and then kneading the convertible methylpolysiloxane for about 5 minutes, dumping the excess water and thereafter air stripping similarly as was done in test Nos. 8 and 9. Although the gum temperature is not given in all instances, this is due to the fact that the temperature of the convertible methylpolysiloxane (identified in the table as "crude gum") was not measured at all times; it is sufficient to point out that the heating was commenced immediately at the beginning of the test so that it can be assumed that the temperature was rising while the removal of volatile materials was going on as evidenced by the fact that the temperature of the vapors leaving the mixer were at elevated temperatures ranging from about 104° to about 134° in the various tests. As will be apparent from the following table, the volatile content of the convertible methylpolysiloxane as shown can be reduced to about 1.5% (from an initial value of 11.1%) by stripping the convertible methylpolysiloxane for two hours with either air or steam in a steam-jacketed Baker-Perkins mixer. Under similar conditions the volatile content of dry un-washed gum is only reduced to 5.5% by vacuum devolatilization for 144 minutes at 50 mm. Hg absolute pressure (27″ of mercury vacuum). Mechanical mixing of 10 weight percent of liquid water into the gum followed by vacuum devolatilization does not result in as rapid removal of volatiles as can be obtained by simple air or steam stripping. Gas stripping of the type described in the present invention removes volatiles from the convertible methylpolysiloxane much more rapidly than vacuum stripping under usual plant vacuums because of the much lower partial pressure of volatiles maintained in the chamber when the stripping gas is used (3 mm. for gas stripping vs. 30–50 mm. for vacuum). The advantages of air and steam stripping over other methods described in Table II below are clearly evident despite the fact that in all cases the kneading action was substantially the same.

It will of course be apparent to those skilled in the art that in addition to the conditions described above, other conditions of kneading and apparatus for the purpose may be used, as well as various other inert gases (many examples of which are given above), rates of introduction of inert gas, heating temperatures, etc. In general, it is preferable to employ at least about 1 lb. of stripping Table II

COMPARISON OF DEVOLATILIZATION RATES

| Elapsed Devolatilization Time, Min. | Total Percent Volatiles | Gum Temperature, ° C. | Temperature of vapor Leaving Mixer, ° C. |
|---|---|---|---|

Test No. 8.—Steam stripping of 3,181 grams of dry crude gum—average steam rate was 90 liters per minute of vapor leaving mixer

| | | | |
|---|---|---|---|
| 0 | 11.1 | | |
| 37 | 7.2 | | 104 |
| 81 | 2.8 | 128 | 127 |
| 162 | 0.9 | 129 | 125 |

Test No. 9.—Air stripping of 3,566 grams of dry crude gum—average air rate was 50 liters per minute of gas leaving mixer

| | | | |
|---|---|---|---|
| 0 | 11.1 | | |
| 15 | 8.2 | | 105 |
| 30 | 6.4 | | 111 |
| 60 | 3.3 | | 120 |
| 113 | 1.5 | 143 | 123 |
| 169 | 0.7 | | 128 |

Test No. 10.—Vacuum stripping of 3,640 grams of dry crude gum—average vacuum 27 inches of mercury

| | | | |
|---|---|---|---|
| 0 | 11.1 | | |
| 62 | 7.1 | | 129 |
| 144 | 5.5 | 140 | 128 |
| 183 | 4.7 | 138 | |

Test No. 11.—Vacuum stripping of 3,484 grams of crude gum into which 350 grams of cold water had been mixed—average vacuum 27 inches of mercury

| | | | |
|---|---|---|---|
| 0 | 11.1+H$_2$O | | |
| 33 | 7.7 | 138 | 114 |
| 108 | 4.5 | 140 | 122 |
| 238 | 2.3 | | 134 |
| 288 | 2.0 | 140 | 127 |

Test No. 12.—Air stripping of 3,541 grams of crude gum which had been washed for 45 minutes and wash water dumped—average air rate was 50 liters per minute of gas leaving mixer

| | | | |
|---|---|---|---|
| 0 | 14.8 (Incl.) (H$_2$O) | | |
| 30 | 7.1 | | |
| 85 | 2.5 | 137 | 121 |
| 129 | 1.7 | | 115 | inert gas per hour or more for each pound of convertible organopolysiloxane being kneaded in the kneading apparatus. In addition, it is desirable that, when measured at atmospheric pressure, the minimum outlet stripping gas temperature when using heated inert gases such as steam, etc., be above 100° C. and that the temperature of the convertible organopolysiloxane and the volatile organopolysiloxanes being removed, should be maintained as long as possible at temperatures between about 125–150° C., and preferably the temperature at the end of the volatilization should be of the order of about 140–150° C. When heating the masses used in the process, temperatures of about 130° to 175° C. are generally desirable in order to obtain the advantageous steam and gum temperatures.

Obviously, the use of higher temperatures and higher steam rates or air rates could shorten the time required for devolatilization. However, these factors will have to be balanced off when considering the type of operation involved, equipment available, the possibility of polymer degradation, etc.

It will be apparent to persons skilled in the art that other convertible organopolysiloxanes, many of which have been described above may be treated by means of the present invention to remove the low boiling volatile organopolysiloxanes contained therein. Thus, for instance, convertible organopolysiloxanes obtained by copolymerizing octamethylcyclotetrasiloxane and hexaphenylcyclotrisiloxane may be treated to remove the low boiling volatile compositions which generally will comprise the same volatile cyclic polydimethylsiloxanes encountered in the treatment of the above-described convertible methylpolysiloxane. Again, when working with convertible ethyl polysiloxanes which may be obtained by polymerizing the hydrolysis product of diethyl dichlorosilane with the usual polymerizing agents, one can remove from the formed convertible ethyl polysiloxane, low molecular weight volatile compositions, for instance, hexaethylcyclotrisiloxane. When one is concerned with convertible methyl ethylpolysiloxanes, one can remove by means of our process the trimer of methyl ethylsiloxane $[(CH_3)(C_2H_5)SiO]_3$.

The convertible organopolysiloxanes containing less than 2 to 5%, by weight, thereof of organopolysiloxanes boiling below 250° C. when measured at 760 mm., have many uses including those described above. They are particularly useful in making cured, solid, elastic organopolysiloxanes having low shrink characteristics when subjected to elevated temperatures for long periods of time and can be employed with compression set additives to make cured products whose compression set characteristics are better than the compression set characteristics of similarly cured compositions but employing instead an organopolysiloxane from which the low boiling organopolysiloxanes have not been removed. The aforesaid compositions of low shrink characteristics and of improved compression set properties are more particularly disclosed and claimed in the copending applications of Ben A. Bluestein, Serial No. 396,069, now Patent No. 2,793,198, and Frederick M. Lewis, Serial No. 396,066, now Patent No. 2,810,705, both applications filed concurrently herewith and assigned to the same assignee as the present invention.

The products of this invention are useful in applications such as for instance, gaskets, tubing, electrical insulation (e. g., as conductor insulation, etc.), shock absorbers, etc. They are particularly suitable for use as gaskets in applications involving high temperature compression conditions, especially those conditions where they may be subjected to the effects of halogenated hydrocarbons as insulating media, namely, in the manufacture of capacitors. Such use as gaskets with their low compression characteristics are especially advantageous when employing compression set additives in combination with the devolatilized convertible organopolysiloxane. Because of their resistance to heat, the cured products have value as materials to be used in applications where natural or other synthetic rubbers fail owing to the deleterious effects of heat. Elastomers produced by the practice of our invention have the additional property of retaining their flexibility at temperatures as low as −40° C.

Our invention, in addition to being capable of use for removing low molecular weight volatile organopolysiloxanes from high molecular weight convertible organopolysiloxanes, can also be used for removing more volatile components in liquid masses of varying viscosity in which a majority of the weight of the mass is a higher viscosity material. Thus, our invention can be additionally employed in removing the water formed in the condensation reaction occurring during the preparation of phenolic resins from a phenol and formaldehyde. Heretofore, extreme caution has been required during the dehydration of such condensation products in order to prevent premature gelling and curing of the phenolic resin due to the elevated temperatures required to effect removal of the water from the more viscous phenolic resinous mass. By means of our invention, it is possible to intensively knead the phenolic resin-water mixture as described above while at the same time introducing through the kneaded mass air or steam which upon evolution from the phenolic resin undergoing the kneading action carries with it at a relatively low temperature and acceptable rate of removal the volatile water contained in the phenolic resinous mass. In a similar manner and employing the techniques described above, one may also remove plasticizers from thermoplastic resins, such as, for instance, vinyl halide resins by subjecting the latter to a kneading action and to the action of an inert gas, such as air or steam. Also by means of our invention, one can remove solvents from high molecular weight, kneadable organopolysiloxanes where such solvents are present as a result of, for example, solution polymerization of low molecular weight organopolysiloxanes to the high molecular convertible state.

What we claim as new and desire to secure by Letters Patent of the United States is:

1. The process which comprises subjecting an organopolysiloxane of at least 500,000 centipoise viscosity to a kneading action at a temperature from 75° to 175° C. while simultaneously and continuously introducing a stripping gas selected from the class consisting of air, steam, nitrogen, neon, and argon through the aforesaid organopolysiloxane by means of the kneading action, and simultaneously and continuously sweeping out by means of the effluent stripping gas, the volatile materials originally present in the aforesaid organopolysiloxane, the organic groups of the organopolysiloxane being monovalent organic radicals selected from the class consisting of monovalent hydrocarbon radicals and chlorinated aryl radicals, there being present from about 1.98 to 2.05 organic groups per silicon atom.

2. The process as in claim 1 in which the inert gas is steam and the organopolysiloxane is free of depolymerizing agents.

3. The process as in claim 1 in which the inert gas is air.

4. The process for removing from a methylpolysiloxane of at least 500,000 centipoise viscosity free of depolymerizing agents and convertible to the cured, solid, elastic state, the volatile, low molecular weight cyclic polydimethylsiloxanes boiling below 250° C. when measured at 760 mm. present in the aforesaid convertible methylpolysiloxane, there being present in the latter methylpolysiloxane from about 1.98 to 2.05 methyl groups per silicon atom, which process comprises kneading the convertible methylpolysiloxane at a temperature of from 75° to 175° C. while simultaneously and continuously introducing steam through the said convertible methylpolysiloxane by means of the kneading action, and simultaneously and continuously sweeping out by means of the effluent stripping gas at least 50 percent of the aforesaid volatile methylpolysiloxanes.

5. The process for removing from a methylpolysiloxane of at least 500,000 centipoise viscosity convertible to the cured, solid, elastic state, the volatile, low molecular weight cyclic polydimethylsiloxanes boiling below 250° C. when measured at 760 mm. present in the aforesaid convertible methylpolysiloxane, there being present in the latter methylpolysiloxane from about 1.98 to 2.05 methyl groups per silicon atom, which process comprises kneading the convertible methylpolysiloxane at a temperature of from 75° to 175° C. while simultaneously and continuously introducing air by means of the kneading action through the said convertible methylpolysiloxane, and simultaneously and continuously sweeping out by means of the effluent gaseous air, at least 50 percent of the aforesaid volatile methylpolysiloxanes.

6. The process for removing from a methylpolysiloxane of at least 500,000 centipoise viscosity in which there are present from about 1.98 to 2.05 methyl groups per silicon atom, the said methyl polysiloxane being free of depolymerizing agents, convertible to the cured, solid, elastic state and containing up to 10 to 15 percent by weight thereof, a mixture of volatile, cyclic polydimethylsiloxanes comprising octamethylcyclotetrasiloxane, decamethylcyclopentasiloxane and dodecamethylcyclohexasiloxane, which process comprises kneading the convertible methylpolysiloxane while maintaining the temperature of the latter between 75° to 175° C. while simultaneously and continuously introducing steam into the kneading chamber and intimately dispersing the said steam through the convertible methylpolysiloxane by means of the kneading action, and thereafter simultaneously and continuously sweeping out the aforesaid volatile cyclic polydimethyl siloxanes from the kneading chamber in the form of volatile vapors in the effluent gaseous steam.

7. The process for removing from a methylpolysiloxane of at least 500,000 centipoise viscosity in which there are present from about 1.98 to 2.05 methyl groups per silicon atom, said methyl polysiloxane being convertible to the cured, solid, elastic state and containing up to 10 to 15 percent, by weight thereof, a mixture of volatile, cyclic polydimethylsiloxanes comprising octamethylcyclotetrasiloxane, decamethylcyclopentasiloxane and dodecamethylcyclohexasiloxane, which process comprises kneading the convertible methylpolysiloxane while maintaining the temperature of the latter between 75° to 175° C. while simultaneously and continuously introducing air into the kneading chamber and intimately dispersing the air through the convertible methylpolysiloxane by means of the kneading action, and thereafter simultaneously and continuously sweeping out the aforesaid volatile cyclic polydimethylsiloxanes from the kneading chamber in the form of volatile vapors in the effluent gaseous air steam.

8. The process for removing a mixture of volatile cyclic polydimethylsiloxanes comprising octamethylcyclotetrasiloxane, decamethylcyclopentasiloxane and dodecamethylcyclohexasiloxane contained in a viscous methylpolysiloxane containing from about 1.98 to 2.05 methyl groups per silicon atom, the said methyl polysiloxane being substantially free of any depolymerizing agent and having a viscosity of from 500,000 to 20,000,000 centipoises when measured at room temperature and being curable to the solid, elastic state, which process comprises (1) intensively kneading the convertible methylpolysiloxane maintained at a temperature of from 75° to 175° C. while simultaneously and continuously introducing steam into the kneading chamber whereby the steam is intimately dispersed into the organopolysiloxane mass as a result of the kneading action, and (2) simultaneously and continuously sweeping out the aforesaid cyclic polydimethylsiloxanes from the kneading chamber as volatile vapors in contact with the effluent gaseous steam, the rate of introduction of the steam ranging from about 0.1 to 1.0 standard cubic ft. per min. per lb. of convertible methylpolysiloxane being treated.

References Cited in the file of this patent
UNITED STATES PATENTS

| | | |
|---|---|---|
| 2,386,467 | Hyde | Oct. 9, 1945 |
| 2,459,387 | McGregor et al. | Jan. 18, 1949 |
| 2,589,317 | Young et al. | Mar. 18, 1952 |

UNITED STATES PATENT OFFICE
CERTIFICATE OF CORRECTION

Patent No. 2,834,754                May 13, 1958

Robert L. Hatch et al.

It is hereby certified that error appears in the printed specification of the above numbered patent requiring correction and that the said Letters Patent should read as corrected below.

Column 12, line 11, claim 7, for the words "gaseous air steam" read -- gaseous air stream --.

Signed and sealed this 23rd day of September 1958.

(SEAL)
Attest:

KARL H. AXLINE
Attesting Officer

ROBERT C. WATSON
Commissioner of Patents